United States Patent [19]

Kadokura et al.

[11] Patent Number: 4,584,243

[45] Date of Patent: Apr. 22, 1986

[54] ABRASIVE, PRODUCTION THEREOF AND USE THEREOF IN MAGNETIC RECORDING MEDIUM

[75] Inventors: Hidekimi Kadokura; Hiroshi Umezaki; Hideaki Murakami, all of Niihama, Japan

[73] Assignee: Sumitomo Chemical Company, Limited, Osaka, Japan

[21] Appl. No.: 545,279

[22] Filed: Oct. 25, 1983

[30] Foreign Application Priority Data

| Nov. 1, 1982 | [JP] | Japan | 57-192904 |
| Nov. 2, 1982 | [JP] | Japan | 57-192838 |
| Jun. 7, 1983 | [JP] | Japan | 57-192904 |
| Jun. 7, 1983 | [JP] | Japan | 57-192838 |
| Jul. 12, 1983 | [JP] | Japan | 57-192904 |
| Jul. 12, 1983 | [JP] | Japan | 57-192838 |

[51] Int. Cl.$^4$ .................................. G11B 5/70
[52] U.S. Cl. ......................... 428/403; 427/128; 252/62.54; 360/134; 360/135; 360/136; 428/404; 428/405; 428/406; 428/407; 428/694; 428/900
[58] Field of Search ............. 428/694, 900, 404, 403, 428/405, 406, 328, 329, 407, 323; 427/128; 360/134–135; 252/62.54; 241/16, 22

[56] References Cited

U.S. PATENT DOCUMENTS

| 3,007,807 | 11/1961 | Radocy | 428/900 |
| 3,630,910 | 12/1971 | Akashi et al. | |
| 3,992,558 | 11/1976 | Smith-Johannsen | 428/404 |
| 4,153,754 | 5/1979 | Huisman | 428/694 |
| 4,191,587 | 3/1980 | Kratel | 428/405 |
| 4,275,113 | 6/1981 | Naruse | 428/900 |
| 4,320,159 | 3/1982 | Ogawa | 428/694 |
| 4,330,600 | 5/1982 | Kawasumi | 428/694 |
| 4,334,887 | 6/1982 | Frank | 428/694 |
| 4,379,809 | 4/1983 | Matsufuji | 428/694 |

FOREIGN PATENT DOCUMENTS

| 51-81110 | 7/1976 | Japan . |
| 55-17816 | 4/1980 | Japan . |

*Primary Examiner*—Ellis P. Robinson
*Attorney, Agent, or Firm*—Stevens, Davis, Miller & Mosher

[57] ABSTRACT

When an abrasive having an oleophilic surface used in a magnetic recording medium obtained by subjecting an inorganic powder having a Mohs hardness of 5 or above and an average particle size of 2 μm across or below to a dry contact treatment with a dispersing agent having an oleophilic group under grinding conditions giving an impact value of 1 G or greater is used in combination with a magnetic powder as a magnetic recording layer of magnetic recording medium, the wear at a magnetic head can be prevented and still characteristics can be improved.

3 Claims, No Drawings

ABRASIVE, PRODUCTION THEREOF AND USE THEREOF IN MAGNETIC RECORDING MEDIUM

BACKGROUND OF THE INVENTION

This invention relates to an abrasive incorporated in magnetic recording media such as magnetic tape, magnetic disc, and the like, and to a magnetic recording medium comprising an abrasive (note: said abrasive is sometimes called a reinforcing agent, because it acts as an abrasive upon a magnetic head, while it serves as reinforcing agent for a magnetic tape or the like). More particularly, this invention relates to an abrasive for use in a magnetic recording medium such as magnetic tape, magnetic sheet, magnetic disc or the like to give excellent wear resistance to the magnetic recording medium without loading surface smothness of the magnetic layer thereof and to give moderate abrasion to a magnetic head to renew the head as well, and relates also to a magnetic recording medium comprising such an abrasive.

A magnetic recording medium such as magnetic tape, magnetic sheet, or magnetic disc used in audio or video equipments or in computers comes in sliding contact at a high relative speed with a magnetic head at the time of recording and reproducing and, as a result, tends to become worn away. Conventional magnetic layers are unsatisfactory in this respect and, hence, a magnetic layer less susceptible to abrasion and of improved durability is demanded. Particularly in the case of a magnetic video recording medium, it is required to improve the socalled still picture reproducing characteristics (still characteristics), wherein recorded signals are reproduced by repeatedly scanning the same part of a magnetic coating with a revolving magnetic head.

To improve the above disadvantages, it has heretofore been proposed to incorporate as a reinforcing agent a nonmagnetic powder material such as chromia ($Cr_2O_3$), alumina ($Al_2O_3$), or silicon carbide (SiC) into the magnetic layer. It is not easy, however, to disperse uniformly the above reinforcing agents in the magnetic layer, and there occurs frequently non-uniformity of the dispersion, resulting in a decrease in wear resistance of the magnetic layer, an excessive wearing of the magnetic head, or a decrease in smoothness of the tape surface. To overcome such disadvantages, there is known a method in which the coating composition to be used in forming the magnetic layer is admixed with a dispersing agent such as n-butyl stearate, liquid paraffin, or sodium alkylbenzenesulfonate in its manufacturing stage and thoroughly mixed in wet state to improve the dispersibility of reinforcing agents. This method, however, is not effective for improving sufficiently the dispersibility.

The present inventors carried out an extensive study to overcome the above difficulties and, as a result, have found that it became possible to improve the dispersibility more effectively, as compared with the known methods, by imparting the dispersibility to a reinforcing agent by a specific method and that by using such a reinforcing agent it became possible to improve the wear resistance of both the magnetic layer and the magnetic head and to improve also the smoothness of the tape surface. This invention has been accomplished based on the above finding.

SUMMARY OF THE INVENTION

One object of this invention is to provide an abrasive for magnetic recording medium and exhibiting excellent dispersibility in the production of a magnetic recording medium.

Another object of this invention is to provide an abrasive having an oleophilic surface for magnetic recording medium to achieve the above object and to provide a process for producing such an abrasive.

A further object of this invention is to provide a magnetic recording medium comprising a support and a magnetic layer coated thereon containing an excellently dispersible abrasive therein.

Still further objects and advantages of this invention will become apparent to those skilled in the art from the following description.

This invention provides a process for producing an abrasive having an oleophilic surface used in a magnetic recording medium which comprises subjecting an inorganic powder having a Mohs hardness of 5 or above and an average particle size of 2 μm across or below to a dry contact treatment with a dispersing agent having an oleophilic group under grinding conditions giving an impact value of 1 G or more, and the abrasive thus produced.

This invention also provides a magnetic recording medium comprising a support and a magnetic recording layer coated thereon, characterized in that said magnetic recording layer contains a magnetic powder and an abrasive having an oleophilic surface produced by the above-mentioned process.

DESCRIPTION OF THE PREFERRED EMBODIMENTS

The inorganic powder materials used in this invention are those having a Mohs hardness of 5 or above and, more particularly, are selected from metal oxides and double oxides such as γ-alumina, α-alumina, silica, iron oxide, chromium oxide, titanium oxide, zirconium oxide, cerium oxide, tin (stannous or stannic) oxide, silicon carbide, spinel, zinc aluminate, and aluminosilicate. Suitable shapes of the powder materials are granular, preferably spherical, with a particle size of 2 μm or below, preferably 0.1 to 1 μm, in average (median particle size), and of a narrow particle size distribution. When an inorganic powder material having an average particle size larger than 2 μm across is used, there arise many problems in that the abrasive action on the magnetic head becomes so large that the head tends to be worn down and even get scratches, there takes place drop-out at the time of recording and reproducing. When the average particle size is too small, the powder material does not meet the primary requirement of improving the wear resistance of the magnetic recording medium. An inorganic powder material having a Mohs hardness below 5 is not desirable, because both the reinforcing effect upon a magentic recording medium and the improvement in wear resistance are no longer expectable. Of the above-listed inorganic powder materials, especially preferred are γ-alumina, α-alumina, chromium oxide, and titanium oxide.

Dispersing agents having oleophilic groups usable in this invention are higher fatty acids having 10 to 18 carbon atoms (hereinafter the number of carbon atoms is referred to as "$C_{10\text{-}18}$") such as decanoic acid, dodecanoic acid, tetradecanoic acid, hexadecanoic acid, octadecanoic acid, and oleic acid, and salts thereof (the term "salt" as used herein means ammonium, sodium, potassium, magnesium, calcium, or aluminum salt and the term "salt" is used hereinafter in the same meaning); salts of sulfuric acid esters of higher ($C_{10-18}$) alcohols such as decyl sulfate salts, dodecyl sulfate salts, tetradecyl sulfate salts, hexadecyl sulfate salts, and octadecyl sulfate salts; salts of ($C_{10-18}$) alkyl-($C_6$ or $C_{10}$)acrylsulfonic acids, such as decylbenzenesulfonic acid salts, dodecylbenzenesulfonic acid salts, tetradecylbenzenesulfonic acid salts, hexadecylbenzenesulfonic acid salts, and octadecylbenzenesulfonic acid salts; salts of di($C_{4-12}$)alkyl sulfosuccinic acid such as di-(2-ethylhexyl) sulfosuccinate salts; polyoxyethylene (attaching 7–13 moles of ethylene oxide, hereinafter referred to as "7–13 moles" for brevity) ($C_{10-18}$) alkyl ether sulfate salts such as polyoxyethylene decyl ether sulfate salts, polyoxyethylene dodecyl ether sulfate salts, polyoxyethylene tetradecyl ether sulfate salts, polyoxyethylene hexadecyl ether sulfate salts, and polyoxyethylene octadecyl ether sulfate salts; poly(7–13 moles) oxyethylene higher ($C_{10-18}$)alcohol ethers such as polyoxyethylene decyl ethers, polyoxyethylene dodecyl ethers, polyoxyethylene tetradecyl ethers, polyoxyethylene hexadecyl ethers, polyoxyethylene octadecyl ethers, and polyoxyethylene oleyl ethers; poly(7–13 moles) oxyethylene($C_{8-18}$)alkylphenol ethers such as polyoxyethylene octylphenol ethers, polyoxyethylene nonylphenol ethers, polyoxyethylene decylphenol ethers, polyoxyethylene dodecylphenol ethers, polyoxyethylene tetradecylphenol ethers, polyoxyethylene hexadecylphenol ethers, and polyoxyethylene octadecylphenol ethers; sorbitan esters of higher ($C_{10-18}$) fatty acids such as sorbitan decanoate, sorbitan dodecanoate, sorbitan tetradecanoate, sorbitan hexadecanoate, sorbitan octadecanoate, and sorbitan oleate; poly(7–13 moles) oxyethylene sorbitan higher ($C_{10-18}$) fatty acid esters such as polyoxyethylene sorbitan decanoate, polyoxyethylene sorbitan dodecanoate, polyoxyethylene sorbitan tetradecanoate, polyoxyethylene sorbitan hexadecanoate, polyoxyethylene sorbitan octadecanoate, and polyoxyethylene sorbitan oleate; poly(7–13 moles)oxyethylene higher ($C_{10-18}$) fatty acid esters such as polyoxyethylene decanoate, polyoxyethylene dodecanoate, polyoxyethylene tetradecanoate, polyoxyethylene hexadecanoate, polyoxyethylene octadecanoate, and polyoxyethylene oleate; higher ($C_{10-18}$) fatty acid glycerol esters such as glycerol dodecanoate, glycerol octadecanoate, and glycerol oleate; higher ($C_{10-18}$)alkylamine acetates such as decylamine acetate, dodecylamine acetate, tetradecylamine acetate, hexadecylamine acetate, and octadecylamine acetate; quaternary ($C_{1-18}$)alkylammonium salts such as decyltrimethylammonium chloride, dodecyltrimethylammonium chloride, tetradecyltrimethylammonium chloride, hexadecyltrimethylammonium chloride, octadecyltrimethylammonium chloride, didodecyldimethylammonium chloride, and dioctadecyldimethylammonium chloride; poly(7–13 moles)oxyethylene ($C_{10-18}$)alkylamines such as polyoxyethylene decylamine, polyoxyethylene dodecylamine, polyoxyethylene tetradecylamine, polyoxyethylene hexadecylamine, and polyoxyethylene octadecylamine; phospholipids such as lecithin; organosilicon compounds known as silane coupling agents such as vinyltrichlorosilane, vinyltriethoxysilane, vinyltris(β-methoxyethoxy)silane, γ-glycidoxypropyltrimethoxysilane, γ-methacryloxypropyltrimethoxysilane, N-β-(aminoethyl)-γ-aminopropyltrimethoxysilane, N-β-(aminoethyl)-Y-aminopropylmethyldimethoxysilane, γ-chloropropyltrimethoxysilane, γ-mercaptopropyltrimethoxysilane, γ-aminopropyltrimethoxysilane, γ-aminopropyltriethoxysilane, β-(3,4-epoxycyclohexyl)ethyltrimethoxysilane, γ-glycidoxypropyltrimethoxysilane, and γ-mercaptopropyltrimethoxysilane; and organotitanium compounds known as titanium coupling agents such as isopropyltriisostearoyl titanate, isopropyltridodecylbenzenesulfonyl titanate, isopropyltris(dioctyl pyrophosphate) titanate, tetraisopropylbis(dioctyl phosphite) titanate, tetraoctylbis(ditridecyl phosphite) titanate, tetra(2,2-diallyloxymethyl-1-butyl)-bis(ditridecyl)phosphite titanate, bis(dioctyl pyrophosphate)oxyacetate titanate, and tris(dioctyl pyrophosphate)ethylene titanate. These compounds can be used alone or as a mixture thereof.

Surfaces of the inorganic powder materials are made oleophilic by a dry contact treatment under grinding conditions giving an impact value of 1 G or more, preferably 3 to 15 G. More concretely, the dry contact treatment can be practiced by using, for example, a ball mill, a vibration mill, etc. The use of a vibration mill with an impact value of 3 to 15 G is particularly preferable. The milling time is usually 1 minute to 10 hours.

The dispersing agent having an oleophilic group can be used in an amount of 0.01 to 20 parts by weight, preferably 0.02 to 10 parts by weight, more preferably 0.5 to 2 parts by weight per 100 parts by weight of the inorganic powder material. If the amount of the dispersing agent is less than 0.01 part by weight, the effect for improving the dispersibility becomes slight. On the other hand, even if the amount is over 20 parts by weight, the effect of improving the dispersibility is not improved any more, and further it is not advantageous from the economical viewpoint to use such a large amount of dispersing agent and at the same time undesirably shows a tendency to bring about a blooming phenomenon due to an excess amount of the dispersing agent in the magnetic recording medium.

Advantages of the abrasives of the present invention for use in magnetic recording media are sufficiently realized when the inorganic powder material having an oleophilic surface is added in an amount of 0.1 to 15, preferably 0.5 to 10, parts by weight per 100 parts by weight of the magnetic powder material. When the amount is below 0.1 part by weight, the wear resistance of the magnetic layer in magnetic recording media becomes inferior, while when it exceeds 15 parts by weight, the abrasion of the magnetic head undesirably increases.

The magnetic material used in this invention may be selected arbitrarily from conventional magnetic materials such as $\gamma$-$Fe_2O_3$, triiron tetraoxide ($Fe_3O_4$), cobalt-containing $\gamma$-$Fe_2O_3$, reduced iron powder, and chromium (IV) oxide ($CrO_2$). The particle size generally used is in the range of from 0.1 to 5 μm, though not limitative.

As binders, there can be used thermoplastic resins, thermosetting resins, or mixtures thereof. Examples of the binder used in this invention are epoxy resins, polyurethane resins, urea resins, polyamide resins, silicone resins, polyester resins, phenol resins, ureaformaldehyde resins, vinyl resins, cellulose derivatives, homopolymers and copolymers of acrylic acid or methacrylic acid, and alkyd resins. These resins can be used alone or in combination thereof.

Advantages of the inorganic powder material having oleophilic surface according to this invention, when used as an abrasive in magnetic recording media, are described below with reference to Examples in which all parts are by weight.

EXAMPLE 1

100 Grams of α-alumina powder having a mean primary particle size of 0.6 μm across and 1 g of sodium dodecanoate were charged into a vibration mill having an inner volume of 3 liters, pulverized (impact value=6 G) and homogenized for 20 minutes.

0.2 G of the alumina powder thus obtained and 10 ml of a medium (methyl ethyl ketone) were charged into a test tube so as to become 10 cm of sample liquid height and shaken for 5 minutes. After the mixture was subjected to a ultrasonic dispersing treatment, it was allowed to stand. After standing for 24 hours, the height of sedimentation was determined by subtracting the height of clarified liquid layer from the initial liquid height.

A greater height of sedimentation means a more excellent dispersibility.

Further, for comparison, the height of sedimentation was measured by repeating the above-mentioned procedure, except that no dispersant (dispersing agent) was used.

The results are summarized in Table 1.

TABLE 1

|  | Height of sedimentation (cm) |
|---|---|
| Product of this invention | 9.6 |
| Comparative product | 0.5* |

Note
*The height of sedimentation was 2 cm after standing for 2 hours.

EXAMPLE 2

80 Grams of an α-alumina powder having a mean primary particle size of 0.6 μm across, 20 g of a γ-alumina fine powder having a mean primary particle size of 0.01 μm across and 3 g of aluminum dodecanoate were charged into a vibration mill having an inner value of 3 liters, pulverized (impact value=6 G) and homogenized for 20 minutes.

Dispersibility of the alumina powder thus obtained was measured in the same manner as in Example 1. As a result, the height of sedimentation was 9.7 cm.

For comparison, the dispersibility was measured after repeating the above-mentioned procedure, except that no dispersant was used. As a result, the height of sedimentation was 0.5 cm (the height of sedimentation was 3 cm after standing for 2 hours).

EXAMPLE 3

100 Grams of α-alumina powder having a mean primary particle size of 0.6 μm across was charged into a vibration mill having an inner volume of 3 liters together with a dispersant of which kind and quantity were as shown in Table 2, and the mixture was pulverized (impact value=6 G) and homogenized for 20 minutes.

Dispersibilities of the alumina powders thus obtained were as shown in Table 2.

TABLE 2

| No. | Dispersant | Amount of dispersant (g) | Height of sedimentation (cm) |
|---|---|---|---|
| 1 | Sodium octadecanoate | 1 | 9.4 |
| 2 | Aluminum dodecanoate | 1 | 9.4 |
| 3 | Aluminum octadecanoate | 1 | 9.2 |
| 4 | Sodium dodecyl sulfate | 1 | 9.3 |
| 5 | Sodium dodecylbenzene-sulfonate | 1 | 9.6 |
| 6 | Sodium octadecylbenzene-sulfonate | 1 | 9.5 |
| 7 | D-2-ethylhexyl sodium sulfosuccinate | 1 | 9.6 |
| 8 | Sodium polyoxyethylene dodecyl ether sulfate | 1 | 9.3 |
| 9 | Polyoxyethylene dodecyl ether | 1 | 9.2 |
| 10 | Sorbitan monododecanoate | 1 | 9.2 |
| 11 | Dodecylamine acetate | 1 | 9.1 |
| 12 | Soybean lecithin | 1 | 9.6 |
| 13 | Sodium dodecanoate | 0.1 | 9.4 |
| 14 | Sodium dodecanoate | 10 | 9.5 |
| 15 | γ-Aminopropyltrimethoxy-silane | 1 | 9.6 |
| 16 | β-(3,4-Epoxycyclohexyl)-ethyltrimethoxysilane | 1 | 9.6 |
| 17 | Dodecanoic acid | 1 | 9.5 |

EXAMPLE 4

100 Grams of a silica powder having a mean primary particle size of 1 μm across and 1 g of sodium dodecanoate were charged into a ball mill having an inner volume of 3 liters, pulverized (impact value=6 G) and homogenized for 4 hours.

Dispersibility of the silica powder thus obtained was 8.9 cm, as expressed by the height of sedimentation.

For comparison, the same treatment as above was repeated except that the sodium dodecanoate was not used. As a result, the height of sedimentation was 0.5 cm.

EXAMPLE 5

100 Grams of a chromium oxide ($Cr_2O_3$) powder having a mean primary particle size of 0.4 μm across and 1 g of sodium dodecanoate were charged into a vibration mill having an inner volume of 3 liters, pulverized (impact value=6 G) and homogenized for 20 minutes. Dispersibility of the chromium oxide powder thus obtained was 9.6 cm, as expressed by the height of sedimentation.

For comprison, the above-mentioned treatment was repeated, except that the sodium dodecanoate was not used. As a result, the height of sedimentation was 1 cm.

EXAMPLE 6

100 Grams of an α-alumina powder having a mean primary particle size of 0.6 μm across and 1 g of sodium dodecanoate as a dispersant were charged into a vibration mill having an inner volume of 3 liters, pulverized (impact value=6 G), and homogenized for 20 minutes.

0.2 Gram of the readily dispersible alumina powder thus obtained and 10 ml of a medium (methyl ethyl ketone) were charged into a test tube so as to become 10 cm of sample liquid height and shaken for 5 minutes.

After the mixture was subjected to a ultrasonic dispersing treatment, it was allowed to stand. After standing for 24 hours, the height of sedimentation was measured. As a result, the height of sedimentation was found to be 9.6 cm.

Using the alumina prepared in the above-mentioned manner, a magnetic coating composition having the following compounding ratio (by weight) was prepared:

| | |
|---|---|
| Ferromagnetic iron oxide | 100 parts |
| Alumina (mentioned above) | 5 parts |
| Vinylite VYHH (trade name: manufactured by Union Carbide Corp., USA) | 15 parts |
| Polyurethane prepolymer | 5 parts |
| Carbon black | 5 parts |
| n-Butyl stearate | 1 parts |
| Liquid paraffin | 0.2 parts |
| Methyl ethyl ketone | 100 parts |
| Toluene | 100 parts |

After homogenization for 20 hours by means of a ball mill, the magnetic coating composition was coated on a polyester base film having a thickness of 20 μm so as to give a thickness in dryness of 6 μm, and then dried. Subsequently, it was cut into a desired width.

COMPARATIVE EXAMPLE 1

A magnetic tape was prepared by repeating the procedure of Example 6, except that the alumina used in the magnetic coating composition of Example 6 was replaced by an α-alumina powder which had not been pulverized together with a dispersant.

EXAMPLE 7

100 Grams of a chromium oxide ($Cr_2O_3$) powder having a mean primary particle size of 0.4 μm across and 1 g of sodium dodecanoate as a dispersant were charged into a vibration mill having an inner volume of 3 liters, pulverized (impact value=6 G) and homogenized for 20 minutes.

Dispersibility of the readily dispersible chromium oxide thus obtained was measured under the same conditions as in Example 6. As a result, the height of sedimentation was found to be 9.6 cm.

Using the chromium oxide prepared in the above-mentioned manner, a magnetic coating composition having the following compounding ratio (by weight) was prepared:

| | |
|---|---|
| Ferromagnetic iron oxide | 100 parts |
| Chromium oxide (mentioned above) | 7 parts |
| Vinylite VYHH (trade name: manufactured by Union Carbide Corp., USA) | 15 parts |
| Polyurethane prepolymer | 5 parts |
| Carbon black | 5 parts |
| n-Butyl stearate | 1 parts |
| Liquid paraffin | 0.2 parts |
| Methyl ethyl ketone | 100 parts |
| Toluene | 100 parts |

After homogenization for 20 hours by means of a ball mill, the above-mentioned magnetic coating composition was coated on a polyester base film having a thickness of 20 μm so as to give a thickness in dryness of 6 μm, and then dried. Subsequently, it was cut into a desired width.

COMPARATIVE EXAMPLE 2

A magnetic tape was prepared by repeating the procedure of Example 7, excpet that the chromium oxide used in the composition of Example 7 was replaced by a chromium oxide powder which had not been pulverized together with a dispersant.

EXAMPLE 8

A magnetic coating composition was prepared according to the recipe of Example 7, except that the chromium oxide of Example 7 was replaced by 100 g of a titanium oxide ($TiO_2$) powder having a mean primary particle size of 0.5 μm across. Using the magnetic coating composition thus obtained, a magnetic tape was prepared.

COMPARATIVE EXAMPLE 3

A magnetic coating composition was prepared according to the recipe of Example 7, except that the chromium oxide of Comparative Example 2 was replaced by a titanium oxide powder which had not been pulverized together with a dispersant. Using the magnetic coating composition thus obtained, a magnetic tape was prepared.

The magnetic tapes prepared above were run for 100 hours in the state of reproduction to measure wears at magnetic heads. Further, by means of a surface roughness meter, the surfaces of the tapes were examined to evaluate the mean roughness at the center line.

TABLE 3

| | Wear at head (μm/100 hrs.) | Mean roughness at center line (μm) |
|---|---|---|
| Example 6 | 1 | 0.02 |
| Comparative Example 1 | 5 | 0.08 |
| Example 7 | 2 | 0.03 |
| Comparative Example 2 | 7 | 0.10 |
| Example 8 | 2 | 0.02 |
| Comparative Example 3 | 3 | 0.08 |

From the descriptions presented above, it is clear that the inorganic powder having an oleophilic surface which is incorporated into the magnetic coating composition of the invention acts as an abrasive for magnetic recording medium to improve the surface smoothness of magnetic recording media and, at the same time, greatly improves the wear resistance of magnetic recording media. Accordingly, the inorganic powder greatly contributes to the improvement of physical properties of magnetic tapes. In the above Examples, a magnetic video tape comprising Co-containing needle-like γ-$Fe_2O_3$ was mentioned as one embodiment of the invention. However, the invention is not limited to it. The use of magnetic metal powders such as magnetic iron powder also brings about a similar effect. The invention is effectively applicable to all kinds of magnetic tapes, magnetic disks and magnetic cards in which any one of the magnetic powders is used.

What is claimed is:

1. In a magnetic recording medium comprising a support and a magnetic recording layer coated thereon, the improvement wherein the magnetic recording layer comprises, per 100 parts by weight of a magnetic powder, 0.1 to 15 parts by weight of an abrasive having an oleophilic surface obtained by subjecting 100 parts by weight of an inorganic powder having a Mohs hardness of 5 or above and an average particle size of 0.1 to 2 μm across to a dry contact treatment with 0.01 to 20 parts by weight of a dispersing agent having an olephilic group under grinding conditions imparting an impact value of IG or greater prior to the mixing with the magnetic powder.

2. A magnetic recording medium according to claim 1, wherein the inorganic powder is a compound selected from the group consisting of metal oxides and metal double oxides, including γ-alumina, α-alumina, silica, iron oxide, chromium oxide, titanium oxide, zirconium oxide, cerium oxide, tin oxide, silicon carbide, spinel, zinc aluminate and aluminosilicate.

3. A magnetic recording medium according to claim 1, wherein the dispersing agent is sodium octandeconate, aluminum dodecanoate, aluminum octadeconate, sodium dodecylsulfate, sodium dodecylbenzenesulfonate, sodium octadecylbenzenesulfonate, D-2-ethylhexyl sodium sulfosuccinate, sodium polyoxyethylene dodecyl ether sulfate, polyoxyethylene dodecyl ether, sorbitan monododecanoate, dodecylamine acetate, soybean lecithin, sodium dodecanoate, γ-aminopropyltrimethoxysilane, β-(3,4-epoxycyclohexyl)-ethyltrimethoxysilane, dodecanoic acid, ammonium dodecanoate, ammonium octadecanoate, ocatadecanoic acid, oleic acid, γ-methacryloxypropyltrimethoxysilane, γ-glycidoxypropyltrimethoxysilane, or γ-mercaptopropyltrimethoxysilane.

* * * * *